(12) United States Patent
Palenik et al.

(10) Patent No.: US 7,257,741 B1
(45) Date of Patent: Aug. 14, 2007

(54) METHODS AND SYSTEMS FOR COMMUNICATIONS DEVICE TROUBLESHOOTING

(75) Inventors: Dirk Palenik, Atlanta, GA (US); John Joseph Horton, Acworth, GA (US); Jess Baker, Stockbridge, GA (US); ReNae Norton, Kennesaw, GA (US)

(73) Assignee: AT&T Intellectual Property, INc., Wilmington, DE (US)

( * ) Notice: Subject to any disclaimer, the term of this patent is extended or adjusted under 35 U.S.C. 154(b) by 579 days.

(21) Appl. No.: 10/603,949

(22) Filed: Jun. 25, 2003

Related U.S. Application Data

(60) Provisional application No. 60/443,111, filed on Jan. 28, 2003.

(51) Int. Cl.
*G06F 11/00* (2006.01)

(52) U.S. Cl. .............................. 714/43; 714/4; 709/220

(58) Field of Classification Search .................... None
See application file for complete search history.

(56) References Cited

U.S. PATENT DOCUMENTS

| | | | |
|---|---|---|---|
| 6,654,914 B1 * | 11/2003 | Kaffine et al. | 714/43 |
| 6,788,705 B1 * | 9/2004 | Rango | 370/465 |
| 6,883,118 B2 * | 4/2005 | Morgan et al. | 714/43 |
| 2002/0122050 A1 * | 9/2002 | Sandberg | 345/705 |
| 2004/0078708 A1 * | 4/2004 | Li et al. | 714/43 |

OTHER PUBLICATIONS

Westell WireSpeed ADSL Modem—www.westell.com/content/support/wrspd517_custref.pdf.*

Whatis.com XML—http://searchwebservices.techtarget.com/sDefinition/0,290660,sid26_gci213404,00.html.*

\* cited by examiner

*Primary Examiner*—Yolanda L Wilson
(74) *Attorney, Agent, or Firm*—Merchant & Gould

(57) ABSTRACT

Methods and systems provide for the troubleshooting of communications devices that interconnect a personal computer or network of personal computers to a network of a service provider. The troubleshooting is provided through a computer application program that may troubleshoot various issues. Issues related to the personal computer and the connection from the computer to the communications device may be analyzed. Additionally, the troubleshooting program may analyze issues related to the communications device and its connection to the service provider's network by the troubleshooting program interacting with a diagnostics program of the communications device and/or the network. The troubleshooting program may provide a graphical user interface to interact with the customer to allow the customer to step through the troubleshooting process while the troubleshooting application program may display information acquired during the troubleshooting for the user and may store the troubleshooting information or forward it to the service provider through the network connection to a server when possible. The troubleshooting program enables this information to be provided to the service provider from the customer without requiring the customer to be technically skilled and without requiring an on-site visit by a technician. Such information allows the service provider to provide guidance to the customer to complete the self-installation or self-repair process.

17 Claims, 11 Drawing Sheets

METHODS AND SYSTEMS FOR COMMUNICATIONS DEVICE TROUBLESHOOTING

RELATED APPLICATIONS

This application claims priority to U.S. Provisional Application 60/443,111, filed on Jan. 28, 2003, and entitled METHODS AND SYSTEMS FOR COMMUNICATIONS DEVICE TROUBLESHOOTING.

TECHNICAL FIELD

The present invention is related to the troubleshooting of communications devices. More particularly, the present invention is related to computer implemented methods and systems for troubleshooting communications devices utilized by a computer system.

BACKGROUND

Service providers offer various communications services to customers including broadband access to the Internet. Special hardware is often required to enable the customer to utilize such services. For example, broadband access may be provided via a digital subscriber line ("DSL") that requires a DSL modem to interconnect the customer's personal computer to the service provider's network. As another example, a router may be required to interconnect several computers of a local area network to a modem that interconnects the local area network to the service provider's network. Service providers often provide the necessary communications device(s) to the customer upon the customer purchasing the particular communications service.

The service provider may provide the customer with the option to self-install the communications device(s) and any associated software. Often, the service provider will provide step-by-step instructions for the customer to perform when installing the communications device(s) and software. However, there are often many variables that may be present and that may cause difficulty for the consumer to fully complete the installation process so that the telecommunications service is fully available. For example, the customer may misunderstand the directions or the customer may choose not to follow them. As other examples, there may be a problem with the personal computer of the customer, with the communications device being installed, or with the network. Any of these problems may cause the installation process to fail.

When the installation process fails, the customer typically calls a customer service representative to request help with the installation. The customer service representative may attempt to talk the customer through solution attempts. If the problem is simple, such as a cable the customer forgot to connect, then this attempt may solve the problem. However, the problem may be more complicated and not evident to the customer and the representative, such as an incorrect setting of the personal computer or a faulty device or connection. In such a situation, a technician may be dispatched to the customer's location to attempt to fix the problem and complete the installation potentially at the expense of the service provider. Alternatively, the customer may become aggravated that the self-installation has failed and may attempt to return the hardware device for an exchange or refund, again at the expense of the service provider.

Furthermore, once the service is operational for the customer, a problem may later result which may prompt the customer to again contact a customer service representative to request help. As with the installation process, the customer service representative may again attempt to talk the customer through solution attempts. The problem may be solved through these attempts, but if the problem is not solved then a technician may be dispatched potentially at the expense of the service provider. Alternatively, the customer may attempt to return the hardware device for an exchange or refund, again potentially at the expense of the service provider.

SUMMARY

Embodiments of the present invention address these issues and others by providing computer-implemented troubleshooting assistance with the use of the communications device, such as during initial installation of the device and/or during its continued use thereafter. Accordingly, the troubleshooting assistance of these embodiments may reduce the burden placed on the service provider.

One embodiment is a method of providing troubleshooting assistance for use of a communications device of a computer system. At the computer system, a computer-implemented application is utilized to perform one or more checks on the computer system and communications device. At the computer system, it is detected from the one or more checks whether there is a problem related to operation of the communications device with the computer system. Also at the computer system, an error code corresponding to the problem detected from the one or more checks is located and displayed.

Another embodiment is a method of providing troubleshooting assistance for use of a communications device of a computer system. At the computer system, a computer-implemented application is utilized to perform one or more checks on the computer system and communications device. At the computer system, it is detected from the one or more checks whether there is a problem related to operation of the communications device with the computer system. Also at the computer system, a troubleshooting tip corresponding to the problem detected from the one or more checks is located and displayed.

Another embodiment is a method of providing troubleshooting assistance for use of a communications device of a computer system. At the computer system, a computer-implemented application is utilized to perform one or more checks on the communications device and external network connected to the communications device. At the computer system, it is detected from the one or more checks whether there is a problem with the external network affecting operation of the communications device. Also at the computer system, a troubleshooting tip corresponding to the problem detected from the one or more checks is located and displayed.

Another embodiment is a method of providing troubleshooting assistance for use of a communications device of a computer system. At the computer system, a computer-implemented application is utilized to perform one or more checks on the communications device. At the computer system, the computer-implemented application is utilized to detect from the one or more checks whether there is a problem related to operation of the communications device that a re-start may solve. Also at the computer system, the computer-implemented application is utilized to initiate the re-start of the communications device upon detecting that there is a problem that the re-start may solve.

Another embodiment is a method of providing troubleshooting assistance for use of a communications device of a computer system. At the computer system, a computer-implemented application is utilized to perform one or more checks on the communications device. At the computer system, the computer-implemented application is utilized to detect from the one or more checks whether there is a problem related to operation of the communications device that a re-set may solve. Also at the computer system, the computer-implemented application is utilized to re-set the communications device upon detecting there is a problem that a re-set may solve.

Another embodiment is a computer system that includes a display, a communications port, and a communications device coupled to the communications port and to an external network. The computer system also includes a processing device in communication with the display and the communication port, wherein the processing device executes an application that performs one or more checks based on the interconnection of the communications port with the communications device and based on the interconnection of the communications device with the external network to detect whether a problem is present. The application locates information corresponding to a detected problem and displays the located information.

Another embodiment is a method of providing troubleshooting assistance for use of a communications device of a computer system. At the computer system, a computer-implemented application is utilized to perform one or more checks on the communications device. The one or more checks are performed by querying a dynamic information store of the communications device that is maintained by the communications device. At the computer system, it is detected from the one or more checks whether there is a problem related to operation of the communications device. Also at the computer system, information corresponding to the problem detected from the one or more checks is located and displayed.

Another embodiment is a method of providing troubleshooting assistance for use of a communications device of a computer system. At the computer system, a computer-implemented application is utilized to perform one or more checks on the computer system and communications device. At the computer system, it is detected from the one or more checks whether there is a problem related to operation of the communications device with the computer system. Also at the computer system, an error code corresponding to the problem detected from the one or more checks is located and is reported from the computer system to a remotely located computer system.

DETAILED DESCRIPTION

Embodiments of the present invention provide for the troubleshooting of communications devices by providing a troubleshooting application program that allows the customer to step through the troubleshooting process. This troubleshooting process may include both troubleshooting of issues related to the personal computer and its connection to the communication device as well as issues related to the communications device and its connection to the service provider's network. The troubleshooting process may also be extended to check for malfunctions of network resources. The troubleshooting process may provide interaction with a diagnostics ability of the communications device. The troubleshooting process may provide a user-friendly graphical user interface to guide the customer through the troubleshooting process and to provide information to the customer that is being acquired, such as the diagnostics information from the communications device.

The information from the troubleshooting program is valuable to both the customer and the service provider. The customer may perform adjustments to the installation based on this information or may relay this information to a customer service representative who may provide additional guidance by phone. Additionally, the information may be stored by the troubleshooting program and/or forwarded over the network to the service provider when possible to allow the service provider to trend the various troubleshooting issues that have occurred to further refine the self-installation, self-troubleshooting, and/or self-repair instructions as well as make further determinations about the types and models of communications devices being offered.

Figure 1:
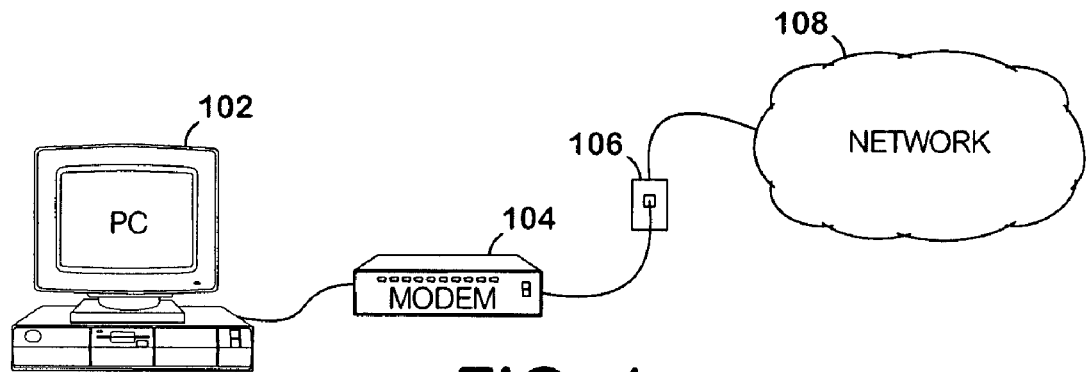
FIG. 1 shows an example of a typical operating environment for a communications device such as a DSL modem that requires troubleshooting.

FIG. 1 shows a typical computing environment where communications devices will be installed and used by the customer. The customer has a personal computer ("PC") 102 that the customer wishes to have interconnected to a service provider's network 108, such as an Internet Service Provider ("ISP"). Such a connection requires one or more communications devices 104, such as a DSL modem, cable modem, ISDN modem, and possibly additional communications devices such as a router or network switch for a local area network. The communications device is connected to the network 108 through a physical connection 106 at the residence or place of business of the customer, such as a standard phone line in the case of a DSL modem 104.

During a self-installation process, the customer must take the communications device 104 and provide a physical connection between the personal computer 102 and the communications device 104. Additionally, the customer must provide a physical connection between the communications device 104 and the connection 106 to the network 108. The communications device 104 also typically requires a connection to a power source (not shown) such as a standard 110 volt wall outlet.

In addition to the physical connections that the customer must make, the customer must also install and configure software on the personal computer 102 to allow the personal computer 102 to communicate with the communications device 104, which enables connection to the network 108. This installation typically involves the installation and/or configuration of a communications driver that allows the operating system of the personal computer 102 to direct communications to the communications device 104 in a suitable manner for communications with the network 108. For example, the communications driver may package data according to a particular communications protocol, such as TCP/IP. Additionally, the installation involves the setup of a utility to provide the credentials of the customer to the network 108 so that the network 108 will authenticate the user and then determine what aspects of the network 108 that user may access.

Various problems may arise during the self-installation. At any point in this installation process, the customer may introduce errors by failing to follow instructions or by making other mistakes such as by mis-typing information or connecting a cable to an incorrect port of the personal computer 102. Additionally, there may be issues that are not introduced by the customer. There may be hardware issues, such as the computer 102 may lack a required feature or may be faulty. Furthermore, the communications device 104 or physical connection 106 to the network 108 may be faulty in some way or the network 108 may be temporarily unavailable to customers.

In addition to problems arising during the self-installation, similar problems may occur later after the self-installation has already been successfully completed. For example, the communications device may suffer a malfunction. As another example, a resource of the external network may suffer a malfunction so that the customer cannot make use of that resource.

The troubleshooting program discussed in more detail below addresses these types of issues during the self-installation process, or at later times, by analyzing the personal computer and its connections as well as interacting with the diagnostics of the communications device to analyze it and its connections as well as its access to various network resources. Through operation of the troubleshooting program, the customer may often solve these problems that have occurred without requiring an on-site visit by a technician and without further aggravation of the customer. In the case of a network malfunction, the customer may be notified so that the customer realizes the problem will be handled by the service provider.

Figure 2:
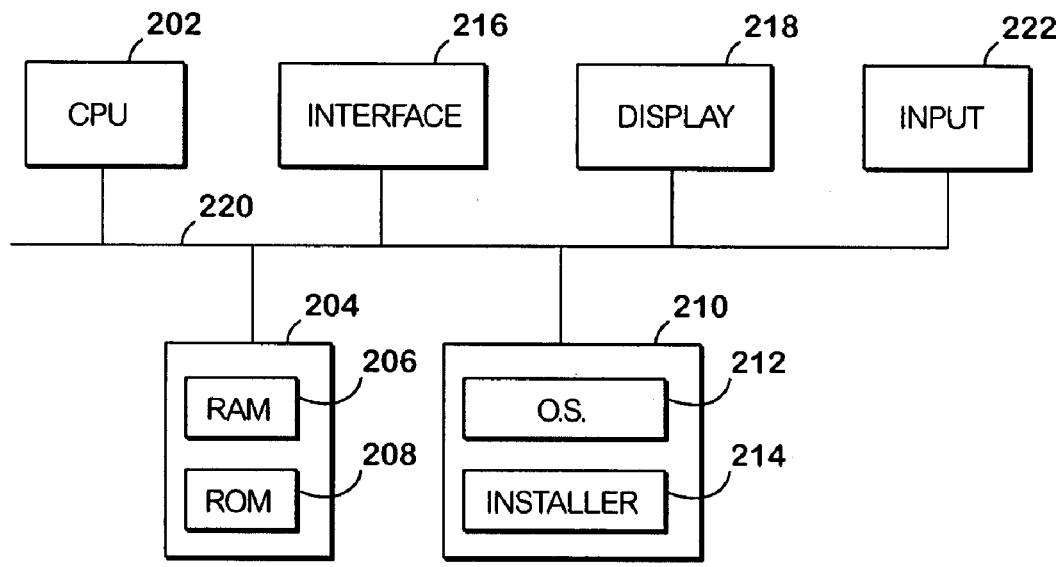
FIG. 2 shows an example of a typical architecture for the personal computer of FIG. 1 that employs a troubleshooting program.

FIG. 2 shows a typical computer architecture as would be in place for the customer's personal computer 102. This computer architecture includes a central processing unit ("CPU") 202 that executes instructions provided by software to cause the computer 102 to provide various functions. The computer includes system memory 204 that includes random access memory ("RAM") 206 and read only memory ("ROM") 208. The ROM 208 stores instructions utilized by the CPU 202 upon boot-up of the computer and the RAM 206 is used to temporarily store information and instructions for the CPU 202 during normal operation of the computer 102. The CPU 202 interacts with the system memory 204 as well as the other components through a system bus 220.

The computer 102 includes various components including a mass storage device 210, such as a hard disk drive and/or a CD-ROM drive. The mass storage device 210 includes various computer programs. An operating system 212 is included to control the operations of the computer 102. The operating system 212 is utilized by the CPU 202 to execute other computer application programs and to utilize the various components of the computer 102.

An installer application 214 may also be included on the mass storage device 210 to provide the installation of the communications device and related service for the customer. The installer application 214 may be provided to the customer as a CD-ROM that the customer loads onto the computer 102 to begin the installation. Typically, the installer application 214 provides a user-friendly graphical user interface to allow interaction with the customer. The installer application 214 may include both step-by-step installation instructions for the user and the troubleshooting procedure discussed in detail with reference to FIGS. 4A-11. Alternatively, the troubleshooting procedure may be provided as a separate application program that is available from the mass storage device 210.

As another alternative, the troubleshooting application may be provided partially or wholly as a network based service. Upon the user successfully completing enough of the installation process to obtain network access, the troubleshooting application may then be downloaded to the mass storage device 210 from the network 108 or may be executed remotely from the network 108.

The computer 102 also includes an interface 216 that allows connection to the communications device. The interface 216 may be of various forms. For a communications device that is installed internally within the personal computer 102, the interface 216 may simply be an available slot that interconnects the communications device to the bus 220. For a communications device that is installed externally, the interface 216 may be dedicated to external communications, such as an Ethernet chipset that provides Ethernet protocol communications between the personal computer 102 and the communications device 104.

The personal computer 102 also includes a display 218 and input 222 to allow the operating system and application programs to interact with the user. The graphical user interface of the troubleshooting procedure is displayed on the display 218, and user input to the troubleshooting procedure is provided through the input 222, such as via a mouse or keyboard.

Figure 3:
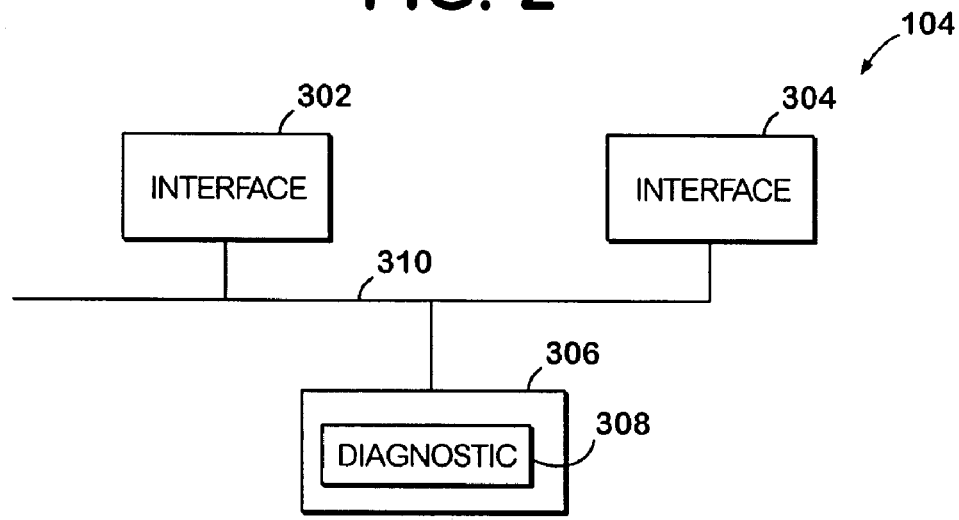
FIG. 3 shows an example of a typical architecture for the communications device of FIG. 1 that is involved in the troubleshooting procedure.

An example of the architecture of the communications device 104 is shown in FIG. 3. The communications device 104 typically includes one interface 302 for communicating with the personal computer 102. For an internal communications device 104, this interface 302 may be a direct interface to the bus 220 of the personal computer 102 which acts as the communication port to the communications device. For an external communications device 104, this interface 302 may be a connection to the external communications interface of the personal computer which acts as the communication port to the communications device, such as an Ethernet interface. This interface 302 shares information with other components of the communications device 104 through a bus 310.

The communications device 104 may also include another interface 304. This interface connects the communications device 104 with another downstream device. For example, for a router this interface 304 may also be an Ethernet connection that leads to an Ethernet connection of a modem. For a modem, this interface 304 may be a connection to the physical connection 106 of the network, such as a DSL telephone line connection to a telephone network leading to the data network 108 or a cable connection to a cable TV network leading to the data network 108.

The communications device 104 also includes on-board processing, in addition to any processing that occurs for the transfer of data between interface 302 and interface 304. The on-board processing is provided through a processing device 306, such as an application specific integrated circuit or other similar processing device type. This processing device executes a diagnostic program 308 to analyze specific information about the communications device 104 and its connections at the interfaces 302, 304. The diagnostic program 308 is stored in on-board memory that is integrated into or separate from the processing device 306. The details of one example of a diagnostic program and its interaction with the troubleshooting program are discussed below with reference to FIGS. 7-11. This diagnostic program may communicate with the troubleshooting application through a defined protocol. One example is that the diagnostic program may post test results to an extensible mark-up language ("XML") document stored in on-board memory that is accessible by the troubleshooting program.

Figure 4A:
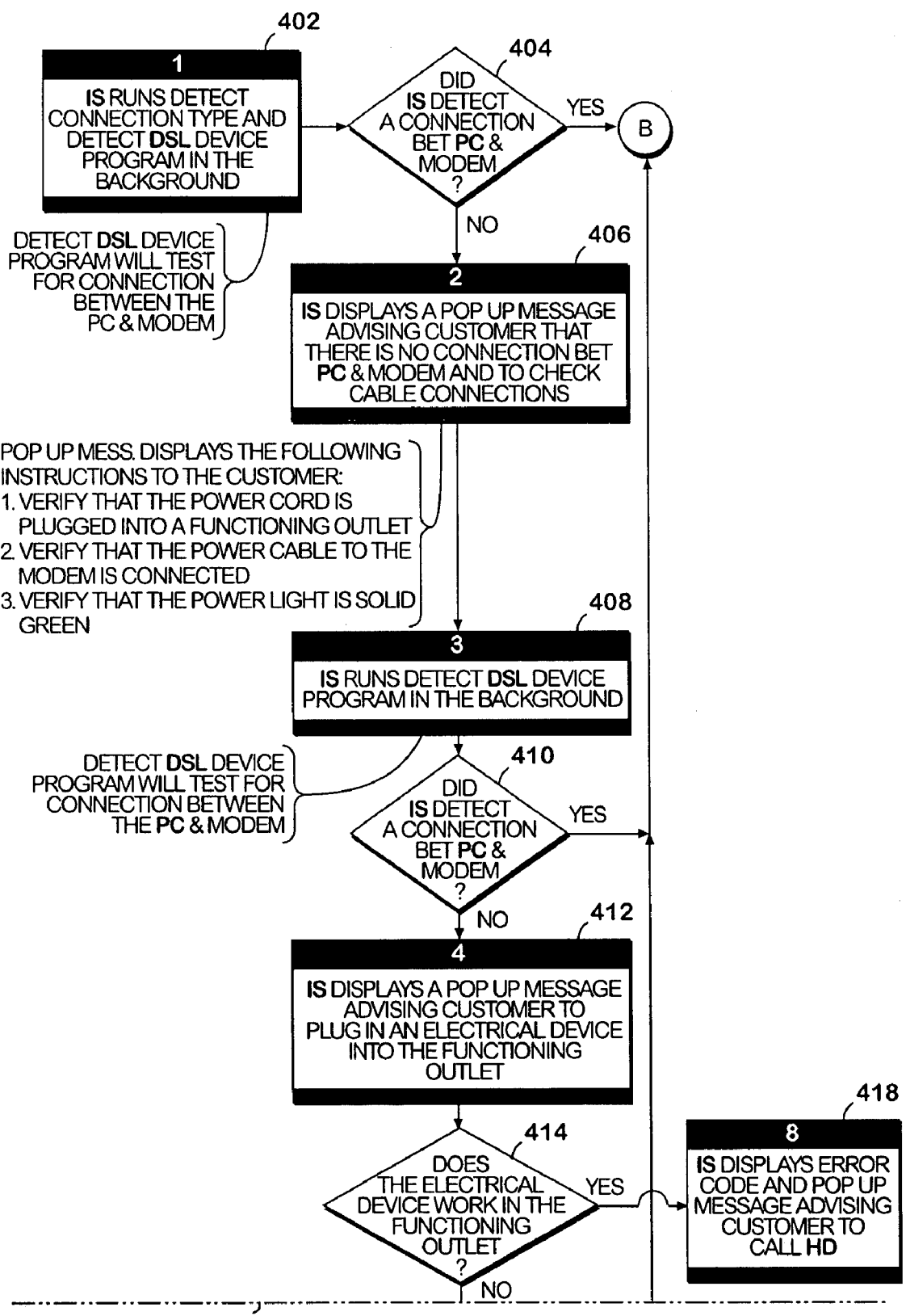
FIGS. 4A and 4B show a first portion of a troubleshooting procedure being performed by the troubleshooting program of FIG. 2.
Figure 4B:
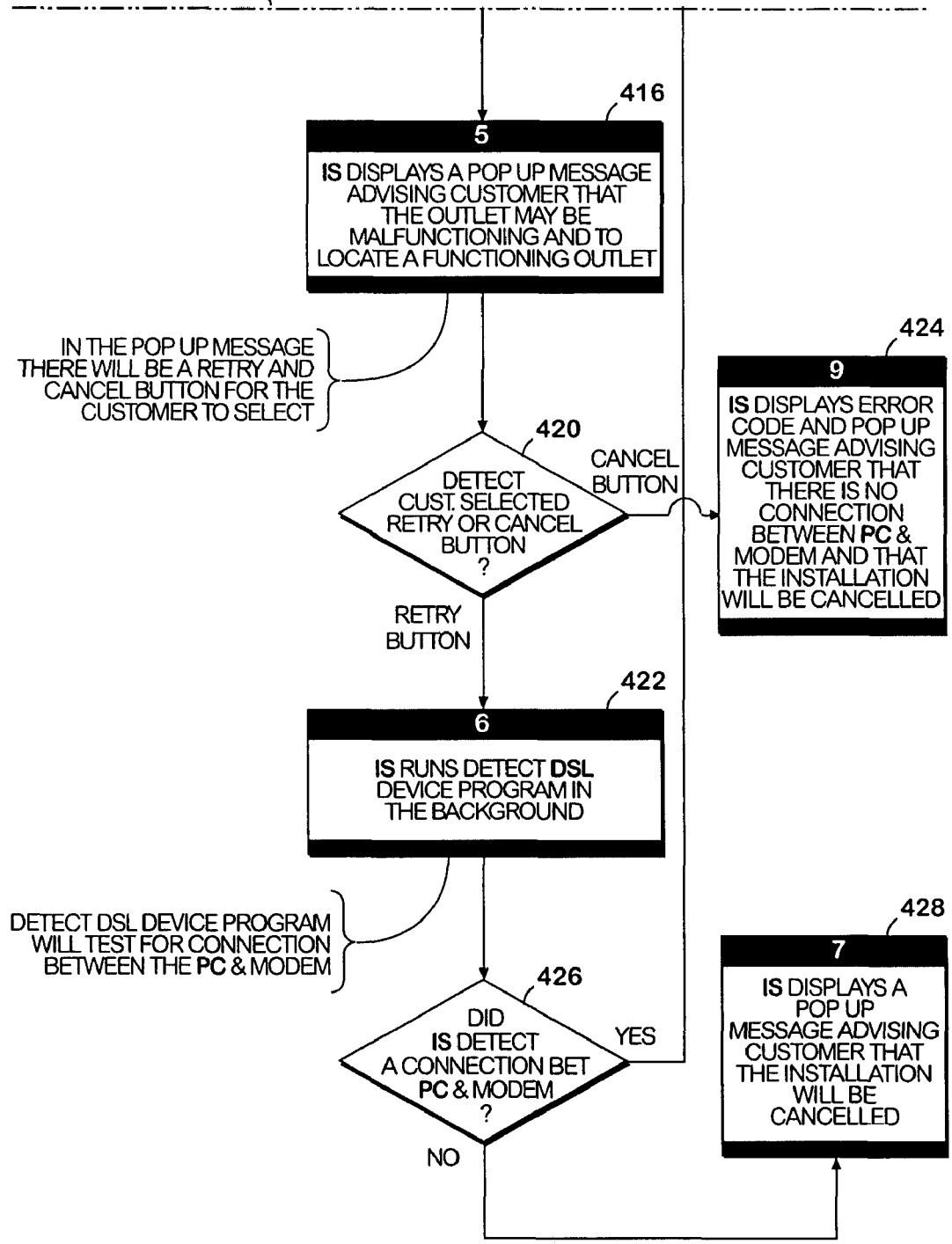

FIGS. 4A and 4B show a first portion of the operational flow of the troubleshooting application that may be a part of the installer application 214 or may be a separate application. For example, as discussed herein, the troubleshooting application is described as forming a part of an installer software ("IS"). It will be appreciated that the troubleshooting application may be used with other installation applications or as a stand-alone application and may be a local service provided on a CD-ROM or diskette or may be downloaded or executed remotely from the network 108 as discussed above. Furthermore, while the troubleshooting application is referred to as forming a part of the IS, it will be appreciated as discussed below that aspects of the troubleshooting application may continue to function after installation is successfully completed to provide an on-going troubleshooting service.

The troubleshooting application may be entered by the user selecting an option within the installer application to begin the troubleshooting, upon automatic operation of the installer application, or upon the user running the troubleshooting application separately when it is provided as a stand-alone application. Furthermore, upon completing the installation, the troubleshooting application may automatically run during operation of the computer system to provide the on-going troubleshooting service. As described herein, the troubleshooting application will be referred to as "IS" in relation to the installer application that incorporates the troubleshooting application as a service. Upon the troubleshooting aspect of IS starting through one of the methods described above, IS detects the connection type between the communication device such as a DSL modem and the personal computer as well as the communication device at detection operation 402. At query operation 404, IS tests whether the connection between the PC and the communication device has been found. If a connection is found, operational flow proceeds to the operations of FIGS. 5A and 5B, discussed below.

If no connection is found, then operational flow continues to display operation 406 where IS displays a pop up message providing a troubleshooting tip to the customer to advise the customer that the connection is missing and that the customer should check the cable connections.

IS then attempts to detect the communication device in the background at detection operation 408. Query operation 410 then again checks for whether IS detected a connection. If so, then operational flow proceeds to the logical operations of FIGS. 5A and 5B. If not, then IS displays another pop up message providing a troubleshooting tip to the customer advising the customer to plug in an electrical device other than the communication device into an electrical outlet that is being used to power the communications device at display operation 412. Query operation 414 then prompts the user to enter whether the electrical device plugged into the outlet is functioning, such as by clicking a 'yes' button or a 'no' button on the graphical user interface ("GUI"). If the electrical outlet is functioning, then at display operation 418, IS displays an error code for the user and displays a pop up message to the user instructing the user to call the customer service/technical support helpdesk ("HD") and to provide the error code to the representative.

If the electrical outlet is not functioning as determined at query operation 414, then IS displays a pop up message providing a troubleshooting tip instructing the customer to find another electrical outlet at display operation 416. Query operation 420 then detects whether the customer is attempting a retry of the test for the device, such as by selecting a 'retry' button or a 'cancel' button of the GUI. If the user has cancelled by clicking the 'cancel' button, then IS displays an error code and pop up message advising the user that there is no connection and the installation is cancelled at display operation 424.

If the user has decided to retry, then IS again attempts to detect the device in the background at detection operation 422. Query operation 426 determines whether the device was detected. If so, then operational flow proceeds to the operations of FIGS. 5A and 5B. If not, then IS displays a pop up message advising the customer that the installation is cancelled at display operation 428.

Figure 5A:
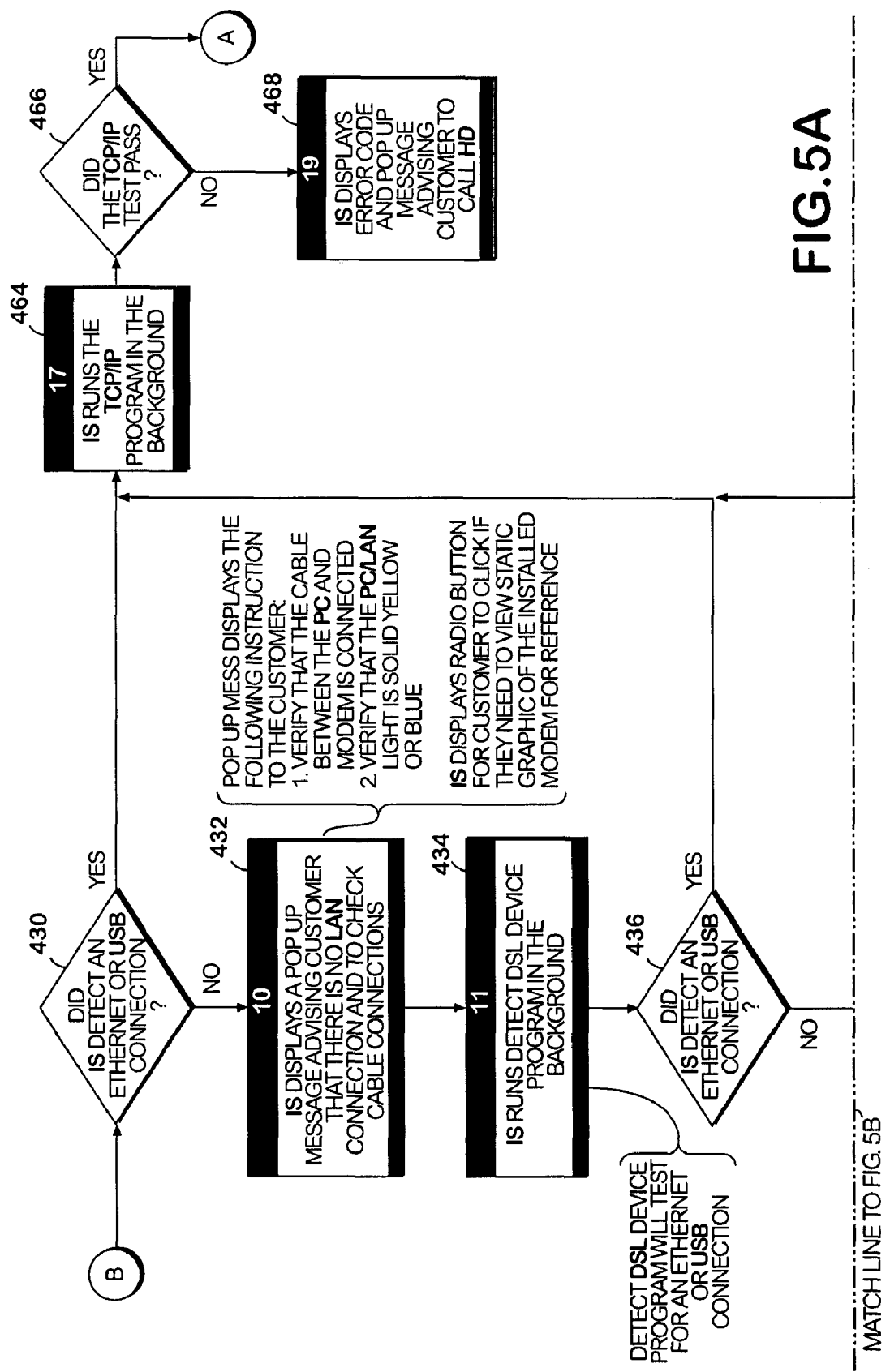
FIGS. 5A and 5B show a second portion of a troubleshooting procedure being performed by the troubleshooting program of FIG. 2.
Figure 5B:
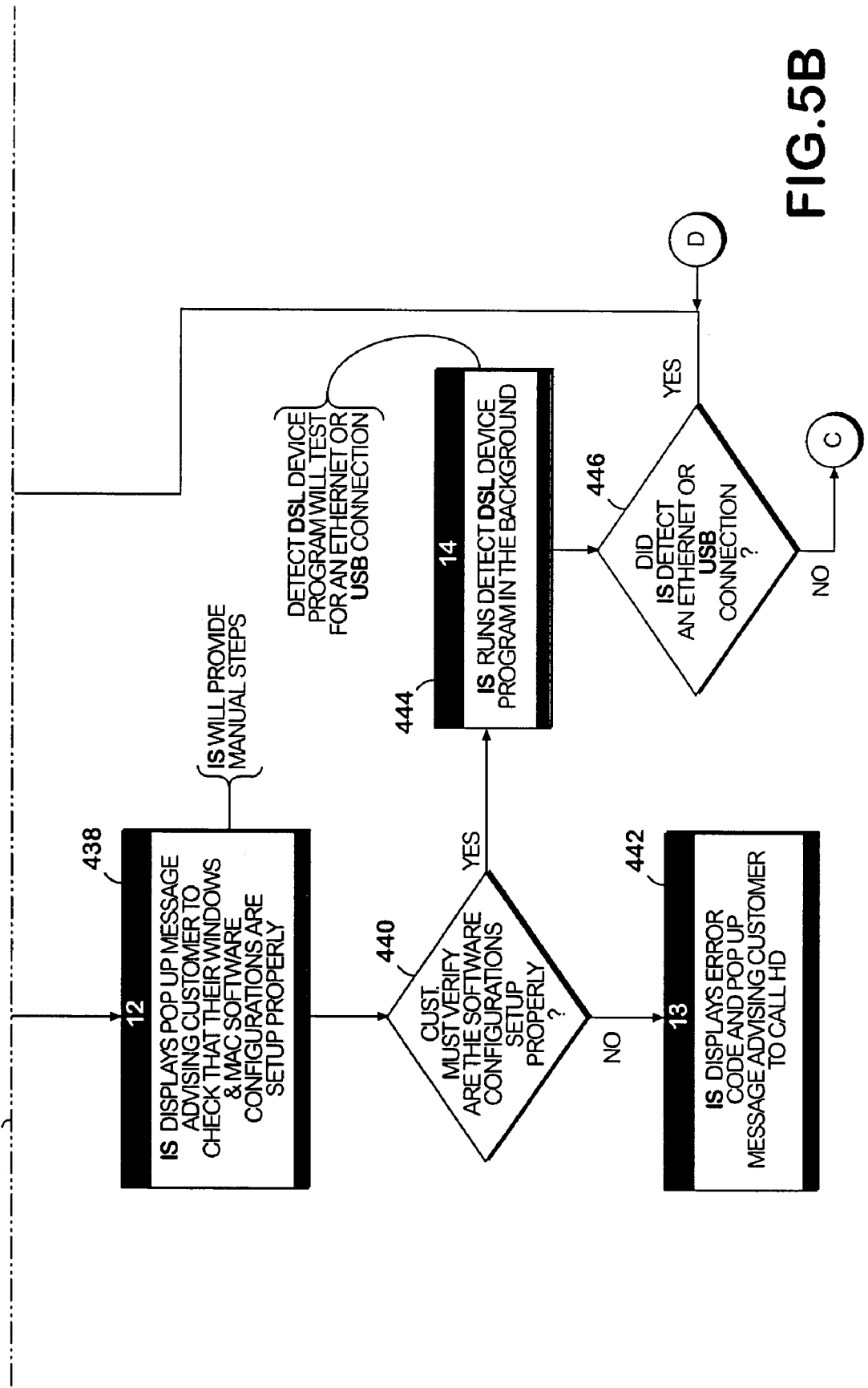

The logical operations of FIGS. 5A and 5B begin at query operation 430 where IS detects whether a particular connection type, such as Ethernet or USB, is provided between the communication device and the personal computer. If so then operational flow proceeds to TCP/IP operation 464 discussed below. If not, then operational flow proceeds to display operation 432 where IS displays a pop up message providing a troubleshooting tip to the customer to advise the user that there is no local area network ("LAN") connection between the computer and the communication device and that the user should again check the cable connection. Specifically, the troubleshooting tip instructs the user to check the cable between the communications device and the personal computer and to verify that the indicator lights of the communications device are lit in a particular way. Additionally, a radio button of the GUI may be displayed to allow the customer to view a graphic of the modem to show how the indicator lights should be lit. IS then again attempts to detect the communication device in the background to determine whether the LAN connection is present at detection operation 434.

Query operation 436 then detects whether an particular LAN connection type was found, such as Ethernet or USB.

If so, then operational flow proceeds to TCP/IP operation 464. If not, then operational flow proceeds to display operation 438 where IS displays a pop up message providing a troubleshooting tip instructing the customer to check that the operating system configurations are set up properly. A manual set of steps may be displayed by IS for the particular operating system that is in use, which may be known based on the particular version of IS that the customer has installed, such as a Mac version or a Windows version. For example, for Windows, the steps may instruct the user to click on the 'Start' button, then the 'settings' button, then the 'network connections' button, and then a particular network connection icon that corresponds to the communication device being installed. Furthermore, the pop up message may display what the correct settings should be so that the user can verify the settings in the operating system. Certain users may choose to correct the settings within the operating system at this time.

Query operation 440 then detects whether the customer has verified that the software configurations for the PC are configured correctly, such as by providing a 'yes' button and a 'no' button. If the not, then IS displays an error code and a pop up message at display operation 442 instructing the user that the software is incorrectly configured and to contact the service representative and provide the error code. If the user indicates that the settings are correct, then IS again attempts to detect the communications device in the background to determine whether the LAN connection is present at detection operation 444.

Query operation 446 then detects whether the LAN connection has been found. If so, then operational flow proceeds to TCP/IP operation 464. If not, then operational flow proceeds to the operations of FIG. 6, discussed in more detail below. Upon operational flow transitioning to TCP/IP operation 464, then IS runs a TCP/IP program in the background to perform a TCP/IP test on the LAN connection that has been found to ensure that the TCP/IP protocol is being correctly supported. Query operation 466 tests whether the TCP/IP test has passed. If not, then IS displays an error code and a pop up message instructing the user that the TCP/IP test failed and to contact the service representative and provide the error code at display operation 468. If the TCP/IP test has passed, then operational flow transitions to the logical operations of FIG. 7, discussed in more detail below.

Figure 6:
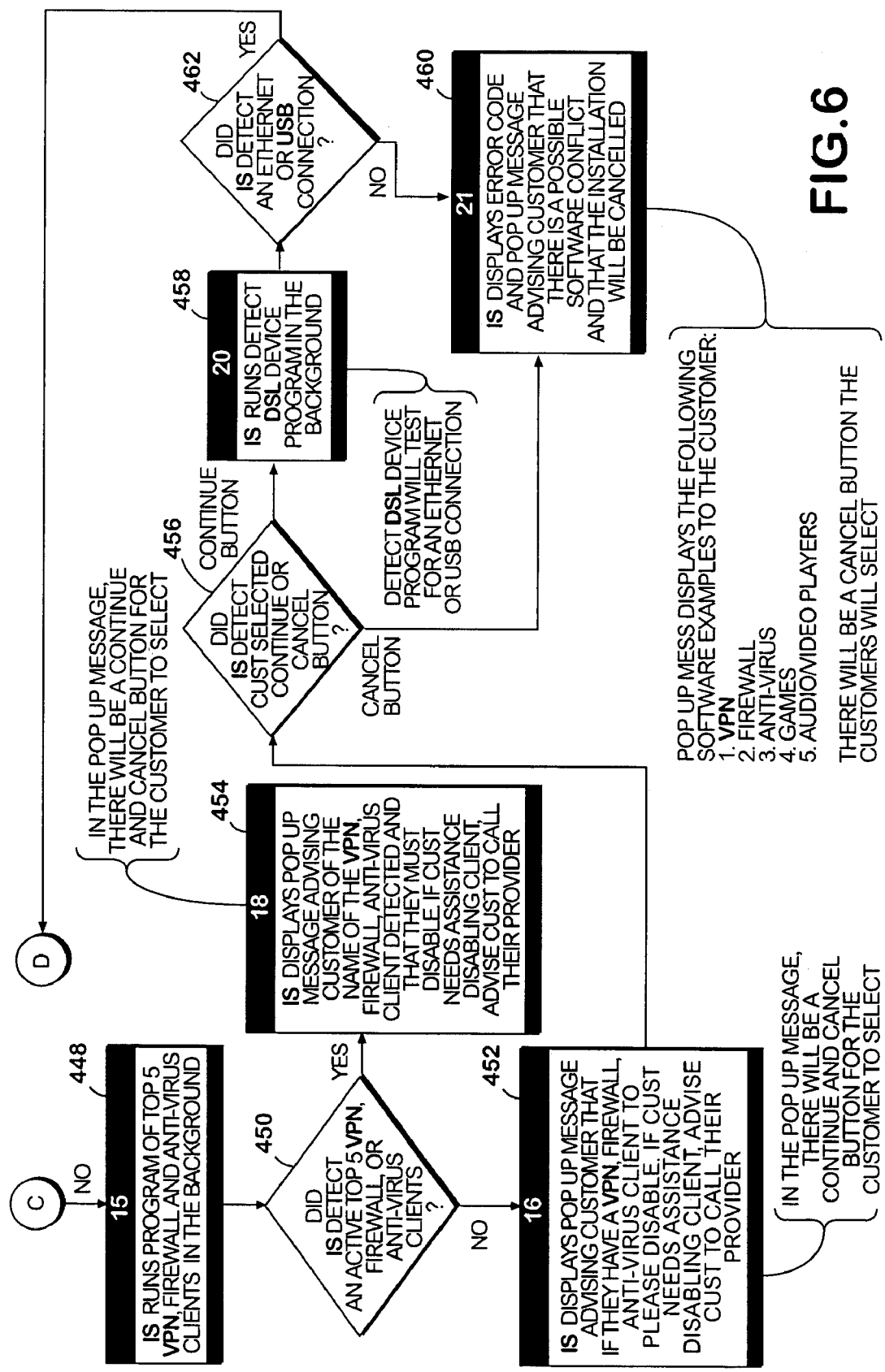
FIG. 6 shows a third portion of a troubleshooting procedure being performed by the troubleshooting program of FIG. 2.

The logical operations of FIG. 6 begin at client operation 448 where IS runs a program in the background searching for the most widely used active virtual private network ("VPN"), firewall, and anti-virus clients. Query operation 450 detects whether IS found a widely used active VPN, firewall, or anti-virus client. If not, then IS displays a pop up message at display operation 452 providing a troubleshooting tip instructing the user that if there is a VPN, firewall, or anti-virus client then it should be disabled. The pop up message may also provide a 'continue' button and a 'cancel' button to allow the customer to choose once the customer has followed the directions of the pop up message. Operational flow then proceeds to query operation 456.

If query operation 450 detects that a top five VPN, firewall, or anti-virus client was found, then operational flow proceeds to display operation 454. At display operation 454, IS displays a pop up message providing a troubleshooting tip instructing the customer of the name of the VPN, firewall, or anti-virus client that has been detected and that this client should be disabled. The user is further instructed to contact the service representative of the client application if the user needs assistance in disabling the named client. Again, the pop up message will provide a 'cancel' button and a 'continue' button that the user may select.

Query operation 456 then detects whether the user has selected the 'cancel' button or 'continue' button. If the user has decided to cancel the installation by clicking the button, the IS displays an error code and instructs the user that there is a possible software conflict and the installation has been cancelled at display operation 460. Examples of the software conflict may be displayed at this point. If the user has decided to continue, then IS attempts to detect the LAN connection in the background at detection operation 458. Query operation 462 determines whether the LAN connection was detected. If so, operational flow transitions to TCP/IP operation 464 of FIG. 5A. Otherwise, operational flow proceeds to display operation 460.

Figure 7:
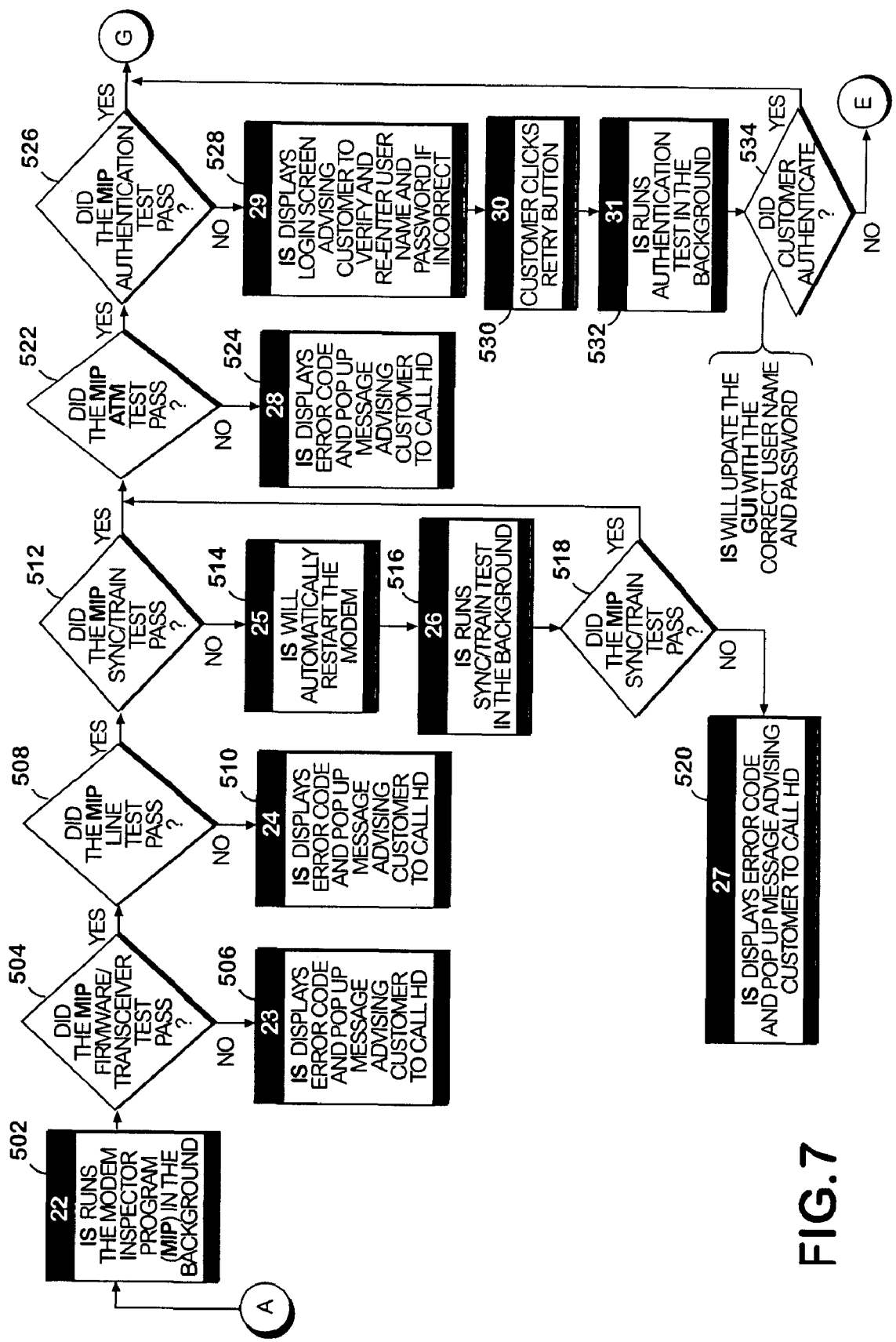
FIG. 7 shows a fourth portion of a troubleshooting procedure being performed by the troubleshooting program of FIG. 2 that also involves interaction with a diagnostics procedure of a diagnostics program of FIG. 3.
Figure 8:
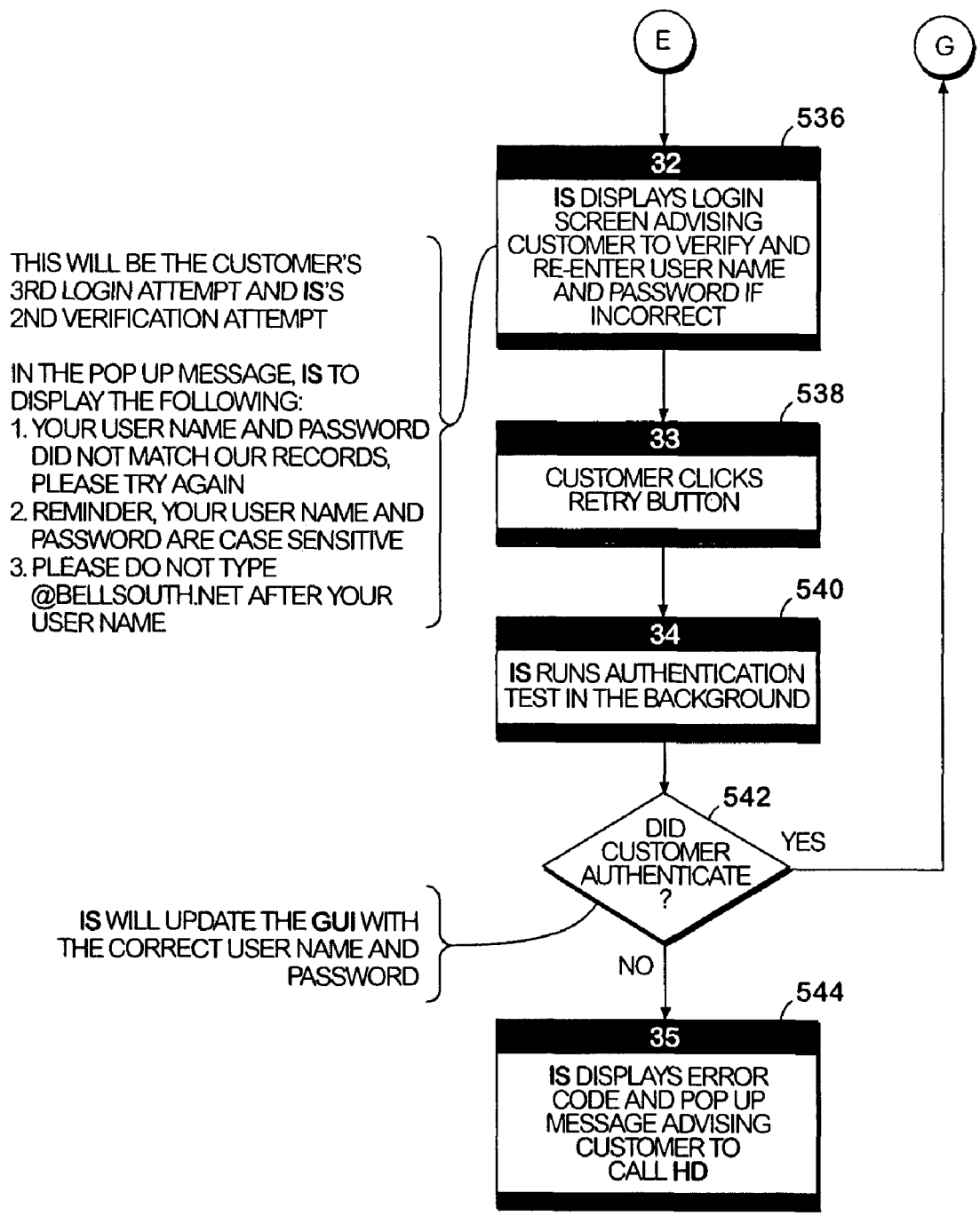
FIG. 8 shows a fifth portion of a troubleshooting procedure being performed by the troubleshooting program of FIG. 2 that also involves interaction with a diagnostics procedure of a diagnostics program of FIG. 3.
Figure 9:
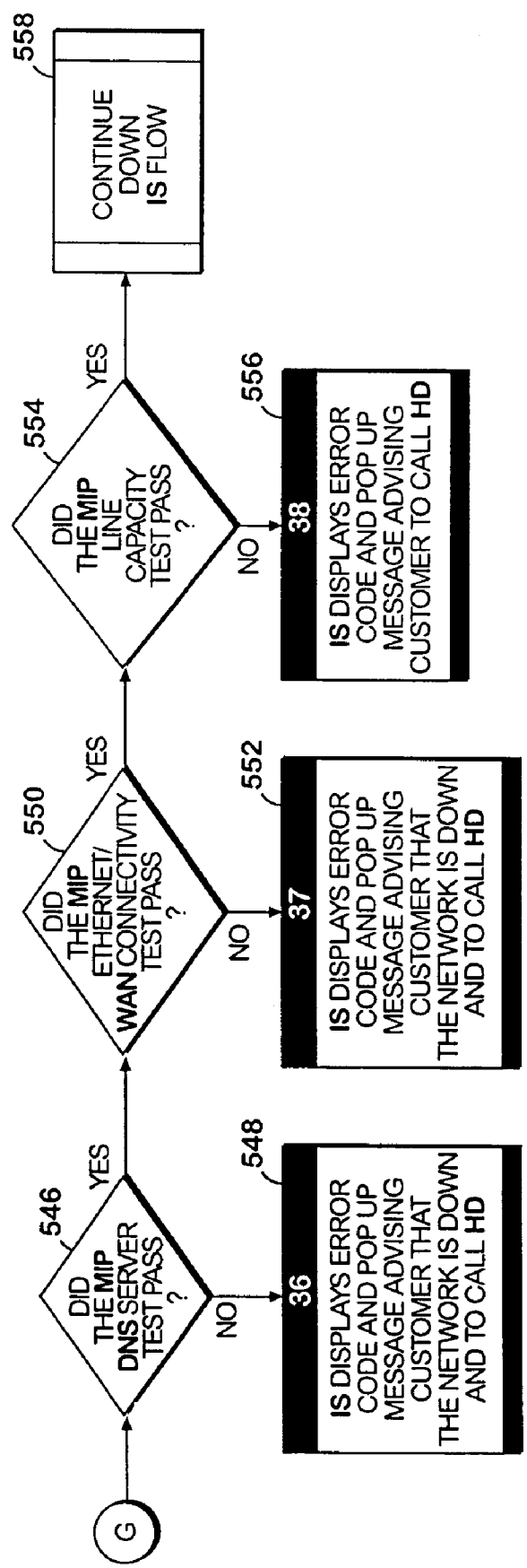
FIG. 9 shows a sixth portion of a troubleshooting procedure being performed by the troubleshooting program of FIG. 2 that also involves interaction with a diagnostics procedure of a diagnostics program of FIG. 3.

The logical operations of FIGS. 7-9 involve the interaction of the IS troubleshooting application with the diagnostics application of the communications device being installed and/or with the dynamic information store of the communications device such as an XML page posted to the on-board memory of the device. The logical operations of FIG. 7 begin at program operation 502 where IS runs the diagnostics program of the communications device in the background. For example, in the case of a modem the diagnostics program may be a modem inspection program (MIP). For purposes of illustration, the diagnostics program will be referred to as MIP in the following discussion. As another example of program operation 502, the IS may simply access the XML page that the communications device is automatically creating to post pass/fail data for various tests performed by the communications device on its own operation.

The IS then communicates through a programmatical interface, such as the XML page or through the MIP interface, via the previously detected physical interface to the communications device to detect whether various tests for the communications device have passed. Initially, the IS communicates with the programmatical interface to determine whether a firmware/transceiver test for the communications device has passed at query operation 504. If not, then IS displays an error code and a pop up message instructing the user that the modem has a problem and to contact the service representative and provide the error code at display operation 506. If the firmware/transceiver test has passed, then operational flow transitions to query operation 508. This test includes various parts, including a determination that VPI/VCI=8/35; verification of correct transceiver code in the firmware with proper functions; and various other standard configuration checks.

At query operation 508, IS communicates with the programmatical interface to determine whether a line test has passed. If not, then IS displays an error code and a pop up message instructing the user that the network connection has a problem and to contact the service representative and provide the error code at display operation 510. If the line test has passed, then operational flow transitions to query operation 512. For example, this test includes passing where DB is less than or equal to 4 while line attenuation is greater than or equal to 53.

At query operation 512, IS communicates with the programmatical interface to determine whether a sync/train test has been passed by the communications device. If not, then IS will automatically restart the communications device at restart operation 514. IS then communicates with the communication device to check the result of the sync/train test that has been attempted again in response to the re-start at test operation 516. Operational flow then transitions to query operation 518. This test includes determining that a modem trains for less than or equal to 90 seconds.

At query operation 518, IS communicates with the programmatical interface to again determine if the communications device passed the sync/train test on this latest attempt. If no, then IS displays an error code and a pop up message instructing the user that the modem has a problem and to contact the service representative and provide the error code at display operation 520. If the sync/train test has been passed, then operational flow proceeds to query operation 522.

At query operation 522, IS communicates with the programmatical interface to determine whether the communications device passed an ATM test. If not, then IS displays an error code and a pop up message instructing the user that the network connection has a problem and to contact the service representative and provide the error code at display operation 524. If the ATM test is passed, then operational flow proceeds to query operation 526. This test may include determining whether ATM cells are received or not from the network.

At query operation 526, IS communicates with the programmatical interface to determine whether an authentication test has passed. Typically, this involves IS providing previously obtained authentication credentials of the user for the network to the communications device, including a user name and password. If the authentication test has passed, then operational flow transitions to the logical operations of FIG. 9, discussed in more detail below. If not, then IS displays a login screen and instructs the user to verify and re-enter the user name and password if incorrect at display operation 528. A 'retry' button may be included in the login screen to allow the user to retry the authentication test. The 'retry' button is clicked at retry operation 530, and IS runs the authentication test in the background at authentication operation 532. Operational flow then transitions to query operation 534.

Query operation 534 detects from the programmatical interface whether the latest authentication test has passed. If so, then operational flow transitions to the logical operations of FIG. 9. If not, then operational flow transitions to the logical operations of FIG. 8.

The logical operations of FIG. 8 begin at display operation 536, where IS displays the login screen again and instructs the user to once again verify the user name and password and re-enter them if incorrect. Specific instructions may be provided by a pop up message, such as a notice that the user name and password are not matching the records of the service provider, that the entries are case sensitive, and that a domain name need not be included with the user name. The 'retry' button may also be provided for the user to select upon verifying and/or re-entering the information. The customer clicks the 'retry' button are retry operation 538, and IS instructs the communications device to again attempt the authentication test in the background at authentication operation 540. Operational flow transitions to query operation 542.

At query operation 542, IS detects whether the authentication test has passed on this latest attempt. If so, then operational flow transitions to the logical operations of FIG. 9. If not, then IS displays an error code and instructs the user that there is an authentication problem and to contact the service representative and provide the error code at display operation 544.

The logical operations of FIG. 9 begin at query operation 546 where IS communicates with the programmatical interface to determine whether a DNS server test passed. If not, then IS displays an error code and a pop up message that instructs the user that the network is down and that the user should contact the service representative and provide the error code at display operation 548. If the DNS server test passed, then operational flow transitions to query operation 550. This test may include pinging a DNS server of the network three times to look for a positive response, where three successful pings are required to pass.

At query operation 550, IS communicates with the programmatical interface to determine whether an Ethernet/WAN test passed. If not, then IS displays an error code and a pop up message that instructs the user that the network is down and that the user should contact the service representative and provide the error code at display operation 552. If the Ethernet/WAN test passed, then operational flow transitions to query operation 554. This test may include determining whether Ethernet frames are received and whether PPPoE Active Discovery Offer packets are received from the network.

At query operation 554, IS communicates with the programmatical interface to determine whether a line capacity test has passed. If not, then IS displays an error code and a pop up message instructing the user that the network has a problem and to contact the service representative and provide the error code at display operation 556. If the line capacity test has passed, then the remainder of the procedures of the IS installation program proceeds as normal at state 558.

Figure 10:
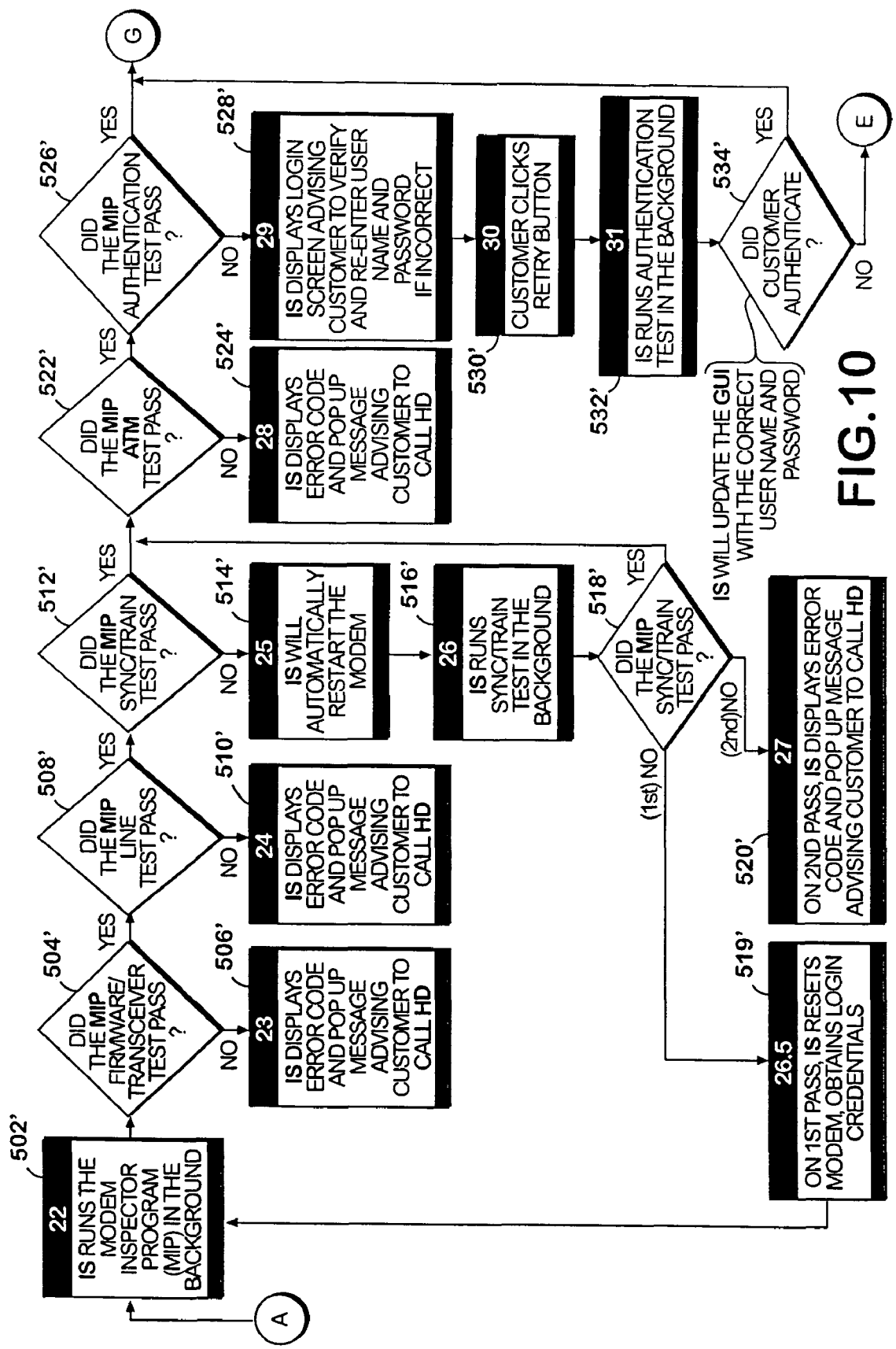
FIG. 10 shows an alternative to the fourth portion shown in FIG. 7 where the troubleshooting procedure being performed by the troubleshooting program of FIG. 2 attempts a re-start and then a re-set of the communications device as necessary.

As an alternative to the logical operations of FIG. 7, the logical operations may be modified as shown in FIG. 10 to accommodate a device re-start attempt where necessary followed by a device re-set when a re-start does not result in a successful sync/train test, as part of the troubleshooting procedure. A re-start of a communication device is limited to the re-starting of its transceiver components while maintaining any data in memory including any device configuration data. A re-set clears the data in memory including the device configuration data and returns it to default values in addition to re-starting the transceiver components. The reference numerals for the logical operations are used in FIG. 10 as they were in FIG. 7 except that a prime designation is given to the reference numerals of FIG. 10 to indicate that they are used in a new context where a re-set may be performed by IS if necessary.

As shown in FIG. 10, the logical operations proceed as shown in FIG. 7 except that upon IS detecting whether the communications device passed the sync/train test at query operation 518', logical flow may take one of three different paths whereas logical flow may take one of two paths in FIG. 7. Where the sync train test passes, then operation flow proceeds to query operation 522' as it did in FIG. 7. However, if the sync train test fails, then on the first pass at query operation 518', operational flow transitions to re-set operation 519'. If the sync train test fails on the second pass at query operation 518', then operational flow proceeds to display operation 520' where the error code for a failed sync/train test is provided to the user in a pop up message.

When operational flow passes to re-set operation 519' on the first pass through query operation 518' where the sync/train test has failed, then the IS re-sets the communications device to return configuration data to its default and to re-start the transceiver components. At this re-set operation 519', a login screen may be provided to the customer to allow the customer to enter login credentials that will be used later if the sync/train test passes following the re-set. Operational flow then returns to the program operation 502' so that the IS can repeat the query to the programmatical interface of the communications device for all tests. Alternatively, operational flow may return directly to query operation 512' after re-set operation 519' to repeat the checks for the sync/train test.

Figure 11:
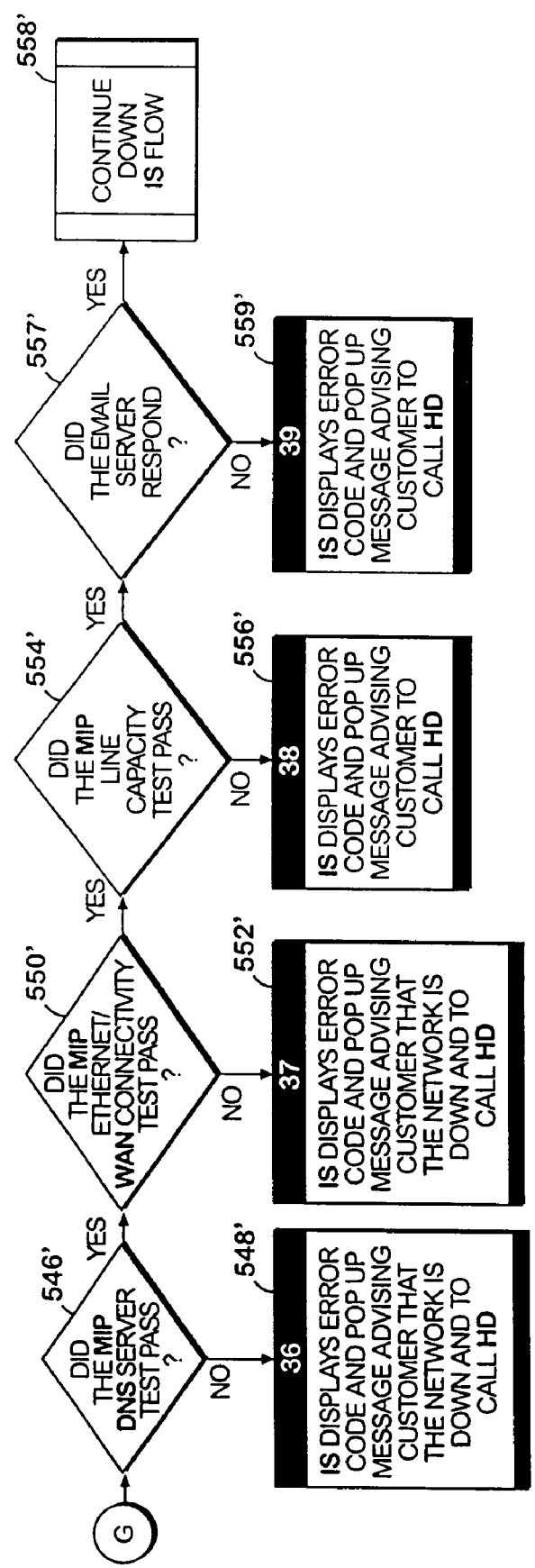
FIG. 11 shows an alternative to the sixth portion shown in FIG. 9 where additional network resources are queried to determine and report their operating status.

As an alternative to the logical operations of FIG. 9, the logical operations may be modified as shown in FIG. 11 to provide testing and reporting of additional individual resources of the network as part of the troubleshooting procedure. The reference numerals for the logical operations are used in FIG. 11 as they were in FIG. 9 except that a prime designation is given to the reference numerals of FIG. 11 to indicate that they are used in a new context where additional network resource checks may be performed by IS if necessary.

As shown in FIG. 11, the logical operations proceed as shown in FIG. 9 except that upon IS detecting that the line capacity test passed at query operation 554', logical flow proceeds to additional queries for additional network resources. As shown, operational flow transitions to query operation 557' where the IS pings an address of an email server that provides email service for the user to determine whether the email server is operational or is off-line. If the email server responds to the ping from IS, then operational flow proceeds to state 558'. If the email server does not respond to the ping from IS, then an error code corresponding to the email server being down may be provided at display operation 559' along with a pop up message instructing the user that the email service is currently not available and that the user may try accessing the email service at a later time.

While specific queries or a specific order to the programmatical interface are provided in FIGS. 7-11, it will be appreciated that some tests and the corresponding query by IS may be omitted, may be done in a different order, or that others may be added. Accordingly, FIGS. 7-11 provide examples and are not intended to be limiting. As an example of how the tests and query order may be changed, the substitute order may be the firmware/transceiver query, then the sync/train query, then the ATM query, then the Ethernet/WAN query, then the authentication query, and finally the DNS ping query.

The operations discussed above with reference to FIGS. 4A-11 enable the customer to be guided step-by-step through the troubleshooting process. Furthermore, these operations either guide the customer to a successful installation or result in an error code being displayed that the user may present to the customer service representative so that this representative will immediately know the trouble the user is experiencing. Thus, the time it takes to resolve the problem is reduced since the service representative no longer needs to ask the customer to proceed through various steps or provide technical information that the customer may not know.

As discussed above, aspects of the troubleshooting procedure may be utilized in an on-going manner after successful installation of the communications device and service have been completed. Accordingly, the logical operations represented in FIGS. 7-11 may repeat periodically or at the request of the user after installation has completed. Accordingly, malfunctions of the communications device or network resources may be detected and reported to the customer through the on-going application of the troubleshooting procedure.

In addition to providing the error codes in a display to the user as discussed above in relation to the troubleshooting procedure, these error codes may be stored and/or forwarded to the network of the service provider when such a connection is available. The service provider may then trend this data to recognize problems that customers are repeatedly experiencing. The service provider may then refine the installation process and instructions as well as the hardware and software that is being provided to the customer.

While the invention has been particularly shown and described with reference to various embodiments thereof, it will be understood by those skilled in the art that various other changes in the form and details may be made therein without departing from the spirit and scope of the invention.

What is claimed is:

1. A method of providing troubleshooting assistance for use of a communications device of a computer system, comprising:

at the computer system, utilizing a computer-implemented application to perform one or more checks on the communications device;

at the computer system, utilizing the computer-implemented application to detect from the one or more checks whether there is a problem related to operation of the communications device that a re-start may solve;

at the computer system, utilizing the computer-implemented application to initiate the re-start of the communications device upon detecting that there is a problem that the re-start may solve;

at the computer system, utilizing the computer-implemented application to detect whether the re-start of the communications device solved the problem; and at the computer system, utilizing the computer-implemented application to re-set the communications device upon detecting that the re-start failed to solve the problem.

2. The method of claim 1, wherein the communications device is a digital subscriber line modem and the problem that a re-start may solve is a failure of a transceiver to synchronize.

3. The method of claim 1, wherein utilizing the computer-implemented application to perform the one or more checks comprises checking a connection between the computer system and the communications device.

4. The method of claim 1, wherein utilizing the computer-implemented application to perform the one or more checks comprises checking operational parameters of the communications device.

5. The method of claim 1, utilizing the computer-implemented application to perform the one or more checks comprises checking for a response from a DNS server.

6. The method of claim 1, utilizing the computer-Implemented application to perform the one or more checks comprises checking for a response from an email server.

7. The method of claim 1, wherein providing troubleshooting assistance for use of the communications device comprises using a digital subscriber line modem.

8. A system for providing troubleshooting assistance for use of a communications device, the system comprising:

a memory storage; and a processing unit coupled to the memory storage, wherein the processing unit is operative to:

utilize a computer-implemented application to perform one or more checks on the communications device, wherein the computer-implemented application is stored on the memory storage unit;

utilize the computer-implemented application to detect from the one or more checks whether there is a problem related to operation of the communications device that a re-start may solve;

utilize the computer-implemented application to initiate the re-start of the communications device upon detecting that there is a problem that the re-start may solve;

utilize the computer-implemented application to detect whether the re-start of the communications device solved the problem; and utilize the computer-implemented application to re-set the communications device upon detecting that the re-start failed to solve the problem.

9. The system of claim 8, wherein the communications device is a digital subscriber line modem and the problem that a re-start may solve is a failure of a transceiver to synchronize.

10. The system of claim 8, wherein the communications device is a digital subscriber line modem.

11. A computer-readable medium which stores a set of instructions which when executed performs a method for providing troubleshooting assistance for use of a communications device of a computer system, the method executed by the set of instructions comprising:

utilizing a computer-implemented application to perform one or more checks on the communications device;

utilizing the computer-implemented application to detect from the one or more checks whether there is a problem related to operation of the communications device that a re-start may solve;

utilizing the computer-Implemented application to initiate the re-start of the communications device upon detecting that there is a problem that the re-start may solve;

utilizing the computer-implemented application to detect whether the re-start of the communications device solved the problem; and utilizing the computer-implemented application to re-set the communications device upon detecting that the re-start failed to solve the problem.

12. The computer-readable medium of claim 11, wherein utilizing the computer-implemented application to initiate the re-start of the communications device comprises utilizing the computer-implemented application when the problem that a re-start may solve comprises a failure of a transceiver to synchronize.

13. The computer-readable medium of claim 11, wherein utilizing the computer-implemented application to perform the one or more checks comprises utilizing the computer-implemented application for checking a connection between the computer system and the communications device.

14. The computer-readable medium of claim 11, wherein utilizing the computer-implemented application to perform the one or more checks comprises utilizing the computer-implemented application for checking operational parameters of the communications device.

15. The computer-readable medium of claim 11, wherein utilizing the computer-implemented application to perform the one or more checks comprises utilizing the computer-implemented application for checking for a response from a DNS server.

16. The computer-readable medium of claim 11, wherein utilizing the computer-implemented application to perform the one or more checks comprises utilizing the computer-implemented for checking for a response from an email server.

17. The computer-readable medium of claim 11, wherein providing troubleshooting assistance for use of the communications device comprises providing troubleshooting assistance using a digital subscriber line modem.

* * * * *